United States Patent
Yoo

(10) Patent No.: US 9,959,619 B2
(45) Date of Patent: *May 1, 2018

(54) APPARATUS FOR PROCESSING MEDICAL IMAGE AND METHOD OF PROCESSING MEDICAL IMAGE BY USING THE APPARATUS

(71) Applicant: SAMSUNG MEDISON CO., LTD., Gangwon-do (KR)

(72) Inventor: Jun-sang Yoo, Gangwon-do (KR)

(73) Assignee: SAMSUNG MEDISON CO., LTD., Hongcheon-Gun, Gangwon-Do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/466,130

(22) Filed: Mar. 22, 2017

(65) Prior Publication Data

US 2017/0193663 A1 Jul. 6, 2017

Related U.S. Application Data

(63) Continuation of application No. 14/492,884, filed on Sep. 22, 2014, now Pat. No. 9,639,930.

(30) Foreign Application Priority Data

Mar. 6, 2014 (KR) .................. 10-2014-0026811

(51) Int. Cl.
  *G06K 9/00* (2006.01)
  *G06T 7/00* (2017.01)
  *G06T 3/40* (2006.01)
  *G06K 9/46* (2006.01)
  *G06K 9/52* (2006.01)

(52) U.S. Cl.
  CPC .............. *G06T 7/0012* (2013.01); *G06K 9/46* (2013.01); *G06K 9/52* (2013.01); *G06T 3/40* (2013.01);

(Continued)

(58) Field of Classification Search
None
See application file for complete search history.

(56) References Cited

U.S. PATENT DOCUMENTS

| | | |
|---|---|---|
| 8,131,107 B2 | 3/2012 | Sun et al. |
| 8,595,653 B2 | 11/2013 | Glaser-Seidnitzer et al. |

(Continued)

FOREIGN PATENT DOCUMENTS

| | | |
|---|---|---|
| EP | 1 349 098 A1 | 10/2003 |
| JP | 2007-020732 A | 2/2007 |

(Continued)

OTHER PUBLICATIONS

Extended European Search Report issued in corresponding European Patent Application No. 14175127.01, dated Mar. 25, 2015; 7 pages.

(Continued)

*Primary Examiner* — Soo Park
(74) *Attorney, Agent, or Firm* — McDermott Will & Emery LLP

(57) ABSTRACT

Provided are an apparatus for processing a medical image, and a method of processing a medical image by using the apparatus. The apparatus includes: an image obtainer that receives a first image obtained by photographing an object; and an image processor that calculates a scaling factor for adjusting a magnification of the first image based on statistic information corresponding to the object and generates a second image to be displayed by normalizing a size of the object by applying the calculated scaling factor to the first image.

20 Claims, 10 Drawing Sheets

(52) U.S. Cl.
CPC .......... *G06K 2009/4666* (2013.01); *G06T 2207/30044* (2013.01)

(56) References Cited

U.S. PATENT DOCUMENTS

| | | |
|---|---|---|
| 9,192,356 B2 | 11/2015 | Matsunaga et al. |
| 9,307,957 B2 | 4/2016 | Frinking et al. |
| 2008/0063305 A1 | 3/2008 | Lim |
| 2011/0172553 A1 | 7/2011 | John et al. |
| 2011/0188716 A1 | 8/2011 | Bennett et al. |
| 2011/0201935 A1 | 8/2011 | Collet-Billon et al. |
| 2013/0006270 A1 | 1/2013 | Schmoll et al. |
| 2013/0336553 A1 | 12/2013 | Buisseret et al. |

FOREIGN PATENT DOCUMENTS

| | | |
|---|---|---|
| JP | 2008-183063 A | 8/2008 |
| JP | 2008-261800 A | 10/2008 |
| JP | 2010-187987 A | 9/2010 |

OTHER PUBLICATIONS

Faria et al., "Quantative analysis of brain pathology based on MRI and brain atlases—applications for cerebral palsy", NeuroImage 54 (2011) 1854-1861.

Fathima et al., "A novel local-phase method of automatic atlas construction in fetal ultrasound", Proc. SPIE 7962, Medical Imaging 2011: Image Processing, 79621A (Apr. 6, 2011).

Woods et al., Automated image registration: I. General methods and intrasubject, intramodality validation, Journal of Computer Assisted Tomography 22(1) 1998.

Oishi et al., "Atlas-based whole brain white matter analysis using large deformation diffeomorphic metric mapping: application to normal elderly and Alzherimer's disease participants", NeuroImage 46 (2009) 486-499.

Akiyama et al., "Age-specific average head template for typically developing 6-month-old infants", PLoS One 8(9(:e73821, Sep. 2013.

Rajagopalan et al., "Local tissue growth patterns underlying normal fetal human brain gyrification quantified in utero", The Hournal of Neuroscience, Feb. 2011.

Shi et al., "Infant brain atlasesfrom neonates to 1- and 2-year-olds", PLoS One 6(4): e18746, Apr. 2011.

Studholme et al., "Mapping fetal brain development in utero using MRI: the Big Bang of brain mapping", Annu Rev Biomed Eng. Aug. 15, 2011; 13: 345-368.

Non-Final Office Action dated Jan. 11, 2016, issued in U.S. Appl. No. 14/492,884.

Final Office Action dated Jun. 30, 2016, issued in U.S. Appl. No. 14/492,884.

Notice of Allowance dated Dec. 22, 2016, issued in U.S. Appl. No. 14/492,884.

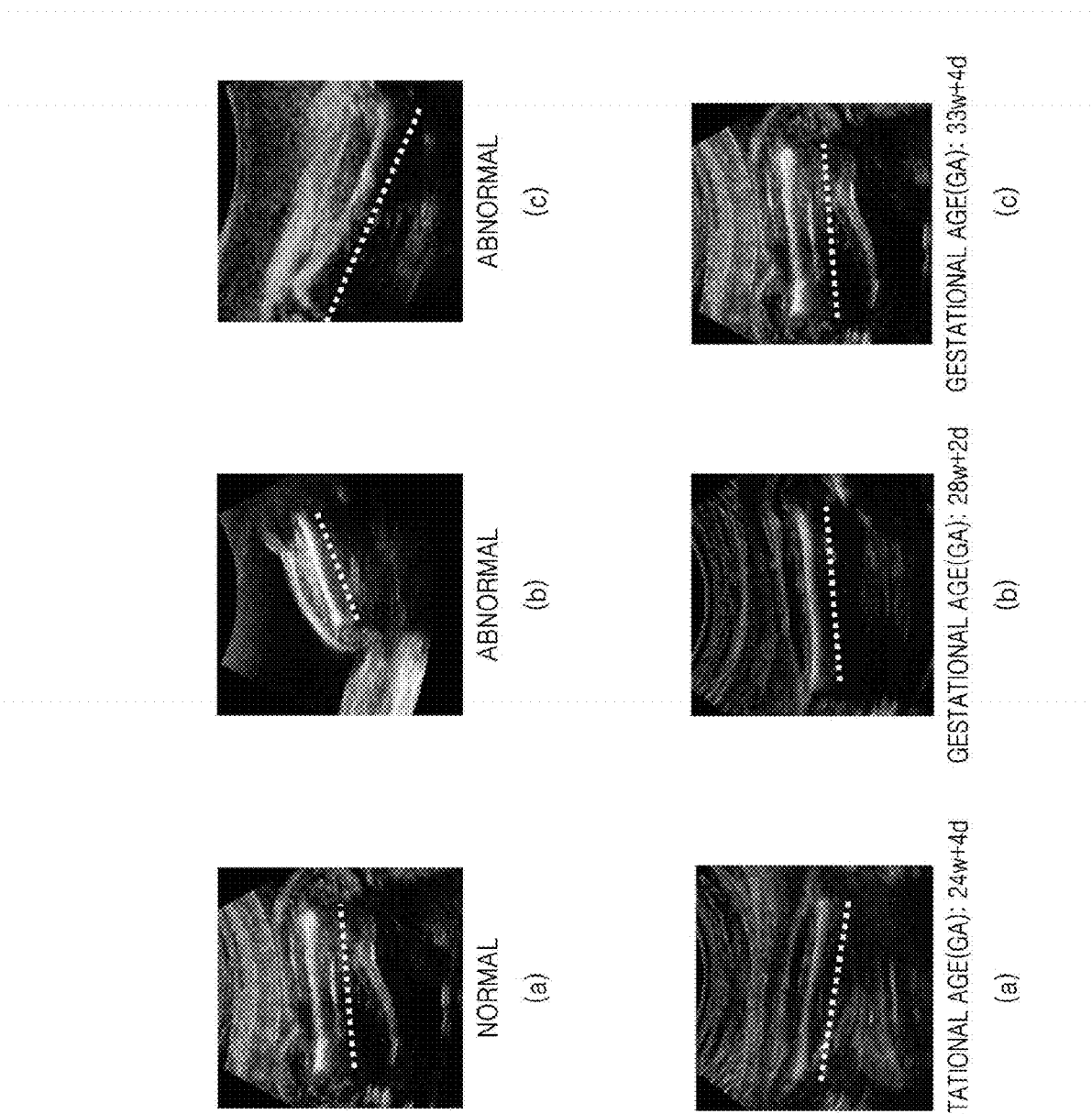

FIG. 6
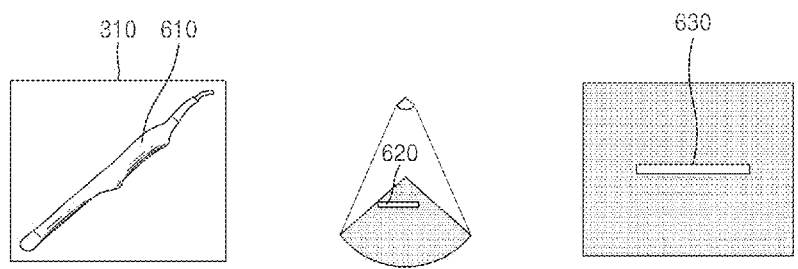
(a)
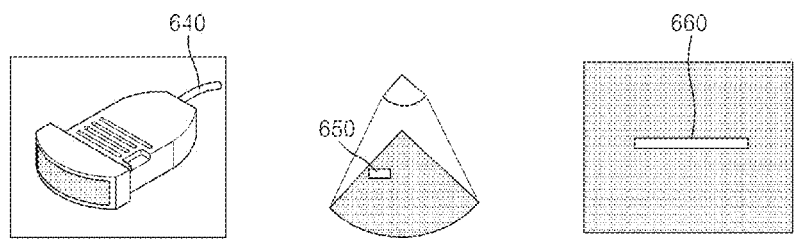
(b)

APPARATUS FOR PROCESSING MEDICAL IMAGE AND METHOD OF PROCESSING MEDICAL IMAGE BY USING THE APPARATUS

RELATED APPLICATIONS

This application is a continuation of U.S. application Ser. No. 14/492,884 filed Sep. 22, 2014, which in turn claims the benefit of Korean Patent Application No. 10-2014-0026811, filed on Mar. 6, 2014, in the Korean Intellectual Property Office, the disclosures of which are incorporated herein in entirety by reference.

BACKGROUND

1. Field

One or more embodiments of the present invention relate to an apparatus for processing a medical image, and more particularly, to an apparatus and method of processing a medical image, which are used to display an object after normalizing a size of the object.

2. Description of the Related Art

An apparatus for processing a medical image is an apparatus for obtaining an image of an internal structure of an object. The apparatus is a noninvasive examination apparatus that photographs and processes structural details, internal tissues, and flow of fluids in a body to be shown to a user. The user, such as a doctor, may diagnose a physical condition and a disease of a patient by using a medical image output from the apparatus. Examples of such an apparatus for capturing and processing a medical image include a magnetic resonance imaging (MRI) apparatus, a computed tomography (CT) apparatus, an X-ray apparatus, and an ultrasonic apparatus, and the apparatus generates a medical image by processing photographed image data.

In order to determine an abnormality of an object by using a general medical imaging apparatus, a medical expert personally searches for a reference view and measures measurement items of the object from the reference view. The medical expert may determine the abnormality of the object by using measurement values, and at this time, the medical expert may suitably expand an image of the object to prevent an error of the measurement values.

According to a general method, a user needs to manually expand or reduce an image to measure an object. In addition, in order to automate measurement of an object in a medical imaging apparatus, a measurement target needs to be detected, and thus detection algorithms need to be developed according to measurement targets. However, even when a detection algorithm is used, an error is highly likely to be generated during detection in abnormal cases Accordingly, an apparatus and method of processing a medical image, wherein an abnormality of an object is simply, easily, and intuitively determined, need to be provided.

SUMMARY

One or more embodiments of the present invention include an apparatus and method of processing a medical image, which calculate a scaling factor for adjusting a magnification of an image based on statistic information corresponding to an object, automatically normalize a size of the object, and display the object.

Additional aspects will be set forth in part in the description which follows and, in part, will be apparent from the description, or may be learned by practice of the presented embodiments.

According to one or more embodiments of the present invention, an apparatus for processing a medical image, the apparatus includes: an image obtainer that receives a first image obtained by photographing an object; and an image processor that calculates a scaling factor for adjusting a magnification of the first image based on statistic information corresponding to the object, and generates a second image to be displayed by normalizing a size of the object by applying the calculated scaling factor to the first image.

The scaling factor may differ depending on at least one of a type, a photographing direction, and a photographing condition of an apparatus for photographing the object.

The apparatus may further include a display unit that displays the second image obtained by normalizing the size of the object.

The statistic information may be determined based on at least one of an age, a photographed region, and a photographed item of the object.

The apparatus may further include a memory that stores the statistic information comprising an average value of sizes of the object being displayed on the first image correspondingly to an average value of actual object sizes.

The scaling factor may be calculated according to Formula 1:

$$S \times \frac{N}{M} \qquad \text{<Formula 1>}$$

wherein in Formula 1, S denotes an initial scaling factor of the first image, M denotes an average value of sizes of the object being displayed on the first image correspondingly to an average value of actual object sizes, and N denotes a size of the object being displayed on the second image when the object is normal.

The medical image may be at least one of a computed tomography (CT) image, a magnetic resonance (MR) image, an X-ray image, and an ultrasonic image.

The medical image may be an ultrasonic image, the object may be fetus, and the statistic information may be determined based on a gestational age of the fetus.

The apparatus may further include a user input unit that receives location information for moving an image center point, wherein the image processor may move the image center point based on the input location information and generate the second image by applying the calculated scaling factor to a modified first image having the moved image center point.

The image processor may detect location information for moving an image center point based on a photographed region of the object, move the image center point based on the detected location information, and generate the second image by applying the calculated scaling factor to a modified first image having the moved image center point.

The second image may correspond to the object and include information indicating a normal object.

The number of at least one of a photographed region and a photographed item of the object may be at least two, and the image processor may calculate a plurality of scaling factors for each of the at least two photographed regions or the at least two photographed items and generate a plurality of second images by applying the calculated plurality of scaling factors to the first image.

The apparatus may further include a display unit that displays the plurality of second images on one screen.

According to one or more embodiments of the present invention, a method of processing a medical image, the method includes: obtaining a first image by photographing an object; calculating a scaling factor for adjusting a magnification of the first image based on statistic information corresponding to the object; and generating a second image to be displayed by normalizing a size of the object by applying the calculated scaling factor to the first image.

The scaling factor may differ depending on at least one of a type, a photographing direction, and a photographing condition of an apparatus for photographing the object.

The method may further include displaying the second image obtained by normalizing the size of the object.

The statistic information may be determined based on at least one of an age, a photographed region, and a photographed item of the object.

The scaling factor may be calculated according to Formula 1:

$$S \times \frac{N}{M} \qquad \text{<Formula 1>}$$

wherein in Formula 1, S denotes an initial scaling factor of the first image, M denotes an average value of sizes of the object being displayed on the first image correspondingly to an average value of actual object sizes, and N denotes a size of the object being displayed on the second image when the object is normal.

The medical image may be at least one of a computed tomography (CT) image, a magnetic resonance (MR) image, an X-ray image, and an ultrasonic image.

The medical image may be an ultrasonic image, the object may be a fetus, and the statistic information may be determined based on a gestational age of the fetus.

The statistic information may be determined based on a photographed item, wherein the photographed item may include at least one of a head circumference (HC), a biparietal diameter (BPD), a cistern magna (CM), a femur length (FL), an anterior-posterior trunk diameter (APTD), a transverse trunk diameter (TTD), an abdominal circumference (AC), a crown rump length (CRL), a posterior horn of the lateral ventricle (Vp), and nuchal translucency (NT).

The generating of the second image may include: receiving location information for moving an image center point based on a user input; moving the image center point based on the received location information and generating a modified first image having the moved image center point; and generating the second image by applying the calculated scaling factor to the modified first image.

The generating of the second image may include: detecting location information for moving an image center point based on a photographed region of the object; moving the image center point based on the detected location information and generating a modified first image having the moved image center point; and generating the second image by applying the calculated scaling factor to the modified first image.

The second image may correspond to the object and include information indicating a normal object.

The second image may include at least one of previous photographing information, a scaling factor, and an actual length of the object.

The number of at least one of a photographed region and a photographed item of the object may be at least two, the calculating of the scaling factor may include calculating a plurality of scaling factors for each of the at least two photographed regions or the at least two photographed items, and the generating of the second image may include generating a plurality of second images by applying the calculated plurality of scaling factors to the first image.

The method may further include displaying the plurality of second images on one screen.

BRIEF DESCRIPTION OF THE DRAWINGS

These and/or other aspects will become apparent and more readily appreciated from the following description of the embodiments, taken in conjunction with the accompanying drawings in which:

FIG. 3 shows images of a normalized object being displayed according to a method of processing a medical image, according to an embodiment of the present invention;

FIG. 4 shows images of a normalized object being displayed according to a method of processing a medical image, according to another embodiment of the present invention;

FIG. 6 is diagrams for describing displaying an object that is normalized by using different probes, according to an embodiment of the present invention;

DETAILED DESCRIPTION

Figure 1:
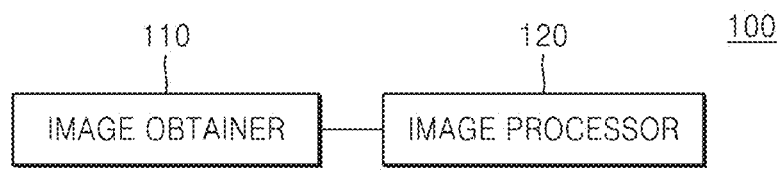
FIG. 1 is a block diagram of an apparatus for processing a medical image, according to an embodiment of the present invention.

Advantages and features of one or more embodiments of the present invention and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present invention will only be defined by the appended claims. Like reference numerals refer to like elements throughout the specification.

Hereinafter, the terms used in the specification will now be briefly defined, and the embodiments will now be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

When a part "includes" or "comprises" an element, unless there is a particular description contrary thereto, the part can further include other elements, not excluding the other elements. Also, the term 'unit' in the embodiments of the present invention means a software component or hardware components such as a field-programmable gate array (FPGA) or an application-specific integrated circuit (ASIC), and performs a specific function. However, the term 'unit' is not limited to software or hardware. The 'unit' may be formed so as to be in an addressable storage medium, or may be formed so as to operate one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and 'units' may be associated with a smaller number of components and 'units', or may be divided into additional components and 'units'.

Reference will now be made in detail to embodiments, examples of which are illustrated in the accompanying drawings. In this regard, the present embodiments may have different forms and should not be construed as being limited to the descriptions set forth herein. In the following description, well-known functions or constructions are not described in detail since they would obscure the embodiments with unnecessary detail.

Expressions such as "at least one of," when preceding a list of elements, modify the entire list of elements and do not modify the individual elements of the list.

Throughout the specification, an "image" may mean multi-dimensional data formed of discrete image elements (e.g., pixels in a two-dimensional (2D) image and voxels in a three-dimensional (3D) image).

Throughout the specification, a "medical image" may mean at least one of a computed tomography (CT) image, a magnetic resonance (MR) image, an X-ray image, and an ultrasonic image, but is not limited thereto.

Throughout the specification, an "object" may include a human, an animal, or a part of a human or animal. For example, the object may include organs such as the liver, the heart, the womb, the brain, a breast, the abdomen, or the like, or a blood vessel. Also, the object may include a phantom. The phantom means a material having a volume that is very close to a density and effective atomic number of an organism, and may include a sphere phantom having a characteristic similar to a physical body.

Throughout the specification, a "user" may be, but is not limited to, a medical expert including a doctor, a nurse, a medical laboratory technologist, a medial image expert, and a technician who repairs a medical apparatus.

Throughout the specification, "statistic information" may include a representative value of a measurement target of a group corresponding to an object. Examples of the representative value include an average value and a median value, but are not limited thereto. Examples of statistic information may include an average value of actual object sizes based on an actual measurement value of an object and an average value of sizes of an object being displayed on an initial image according to the average value of the actual object sizes, but are not limited thereto.

Throughout the specification, a "scaling factor" may be a ratio of a length being displayed on an image with respect to an actual length. For example, when a scaling factor is 1, an object is displayed on an image in its actual size, when a scaling factor is lower than 1, an object is displayed on an image in a size smaller than an actual size, and when a scaling factor is higher than 1, an object is displayed on an image in a size larger than an actual size.

Hereinafter, one or more embodiments of the present invention will be described in detail with reference to accompanying drawings.

FIG. 1 is a block diagram of an apparatus 100 for processing a medical image, according to an embodiment of the present invention.

The apparatus 100 according to an embodiment of the present invention includes an image obtainer 110 and an image processor 120.

The image obtainer 110 according to an embodiment of the present invention receives a first image obtained by photographing an object. Here, the first image is a medical image, and may be at least one of a CT image, an MR image, an X-ray image, and an ultrasonic image as described above.

The image processor 120 according to an embodiment of the present invention calculates a scaling factor for adjusting a magnification of the first image based on statistic information corresponding to the object, and generates a second image to be displayed by normalizing a size of the object by applying the calculated scaling factor to the first image. In other words, the first image is a medical image before a scaling factor is applied, and the second image is a medical image after a scaling factor is applied.

In detail, the scaling factor may differ depending on at least one of a type, a photographing direction, and a photographing condition of an apparatus for photographing the object.

For example, let's assume that the object is a fetus.

When a crown rump length (CRL) of a fetus photographed by using the same 3-dimensionall (3D) probe is examined, a CRL displayed on a medical image obtained by photographing a side of the fetus according to a side photographing condition, and a CRL displayed on a medical image obtained by photographing a front of the fetus according to a front photographing condition may be different from each other.

Alternatively, when a fetus is photographed by using different types of probes under the same front photographing condition, a size of the photographed fetus being displayed may differ due to a resolution difference, etc. depending on the different types of probes. For example, the size of the photographed fetus being displayed may differ when the fetus is photographed by using an endocavitary probe and when the fetus is photographed by using a convex probe.

When the size of the object being displayed differs depending on at least one of the type, the photographing direction, and the photographing condition of the apparatus for photographing the object, it is difficult to intuitively determine an abnormality of the object based on only the size of the object displayed on a display, and the abnormality of the object may be determined based on a measurement value via a measuring operation.

As described above, the image processor 120 controls an image captured in various sizes according to at least one of a type, a photographing direction, and a photographing condition of a photographing apparatus to be displayed after normalizing a size of an object by using a scaling factor.

Also, the statistic information may be determined based on at least one of an age, a photographed region, and a photographed item of the object. Here, the photographed item may differ depending on an object, and may be a measurement item required to diagnose a disease or normality of the object.

For example, when the object is a heart, a value for determining a disease in the heart may be a diameter of aorta (AO). In this case, a photographed item may be an 'aorta diameter'. In the above example, statistic information may be an average value of aorta diameters when diameters of aortas are measured according to age groups.

In another example, when the object is a fetus, biometrics for determining a normal growth of the fetus may be a measurement item. In this case, examples of a photographed item include a CRL, a biparietal diameter (BPD), a head circumference (HC), an abdominal circumference (AC), a femur length (FL), and a humerus length (HL). In the above example, statistic information may include an average measurement value of certain biometrics according to a gestational age (GA) of the fetus. According to an embodiment of the present invention, the scaling factor may be calculated according to Formula 1:

$$S \times \frac{N}{M} \qquad \text{<Formula 1>}$$

In Formula 1, S denotes an initial scaling factor of a first image. M denotes an average value of sizes of an object being displayed on the first image correspondingly to an average value of actual object sizes, and may be stored as statistic information in the apparatus 100. In detail, when an object having a size corresponding to an average value is displayed on a screen that displays a first image, the size of the object being displayed on the screen may be M. N denotes a size of an object displayed on a second image when the object is normal, and may be a pre-set value or set by a user input. For example, N may denote a size of an object displayed on a screen when the object is normal and the normal object having an average size is displayed on the screen that displays a second image. Alternatively, N may be a certain value set by a user or the like.

For example, M that denotes the average value of the sizes of the object being displayed on the first image correspondingly to the average value of the actual object sizes may be stored in the apparatus 100 as statistic information.

In another example, the average value of the actual object sizes may be stored in the apparatus 100 as statistic infor-mation. In this case, M may be calculated by multiplying the initial scaling factor of the first image by the average value of the actual object sizes.

The image processor 120 according to an embodiment of the present invention may generate a second image by moving an image center point and then applying the scaling factor to the first image.

For example, the image processor 120 may move the image center point based on location information determined based on a user input. The image processor 120 may generate the second image by applying the calculated scaling factor to a modified first image having the moved image center point.

In another example, the image processor 120 may detect the location information for moving the image center point based on a photographed region of the object, and move the image center point based on the detected location information. The image processor 120 may generate the second image by applying the calculated scaling factor to the modified first image having the moved image center point.

According to an embodiment of the present invention, since the object is displayed after the size of the object is automatically normalized, an operation of manually expanding or reducing a medical image on which the object is displayed is not required.

Also, a general automatic zooming technology requires a separate detection algorithm for detecting an object according to objects, but according to an embodiment of the present invention, an automatic zooming technology may be realized without having to use a separate algorithm.

Also, since the object is displayed after the size of the object is normalized, an abnormality of the object may be intuitively determined.

Figure 2:
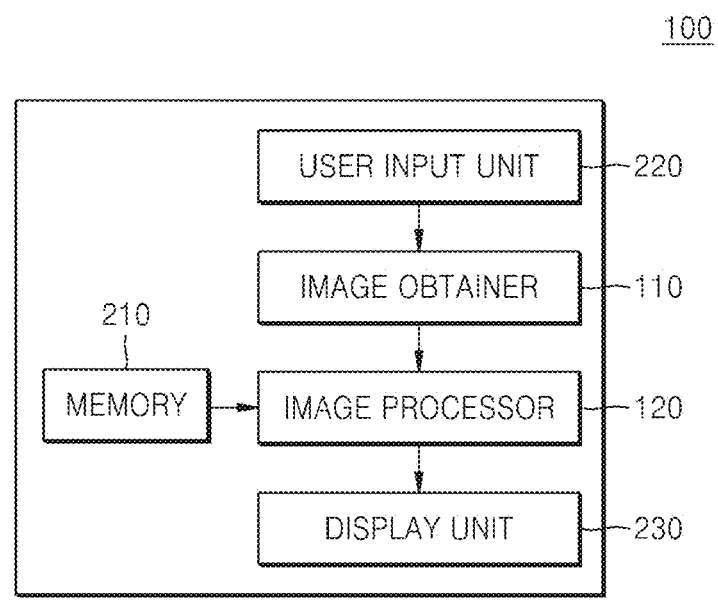
FIG. 2 is a block diagram of an apparatus for processing a medical image, according to another embodiment of the present invention.

FIG. 2 is a block diagram of an apparatus 100 for processing a medical image, according to another embodiment of the present invention.

The apparatus 100 according to an embodiment of the present invention may include a memory 210, a user input unit 220, the image obtainer 110, the image processor 120, and a display unit 230. However, not all components illustrated in FIG. 2 are essential components. The apparatus 100 may be realized by more or less components than the illustrated components. The image obtainer 110 and the image processor 120 of FIG. 2 respectively correspond to the image obtainer 110 and the image processor 120 of FIG. 1, and thus repeated descriptions thereof are not provided.

The memory 210 according to an embodiment of the present invention may store statistic information about an object. For example, the memory 210 may store statistic information including an average value of sizes of the object displayed on a first image correspondingly to an average value of actual object sizes.

In another example, the memory 210 may store statistic information including the average value of the actual object sizes. The average value of the sizes of the object displayed on the first image correspondingly to the average value of the actual object sizes may be calculated by multiplying an initial scaling factor of the first image to the average value of the actual object sizes stored as statistic information.

The user input unit 220 according to an embodiment of the present invention may receive information about at least one of the object, a photographed region, and a photographed item.

Also, the user input unit 220 according to an embodiment of the present invention may receive location information for moving an image center point. The image center point is a center point of a display view for viewing the object. A user may move the image center point through the user input unit 220 such that an image is displayed in a direction an item to be measured is satisfactorily shown. For example, a CRL of a fetus may be accurately measured on a mid-sagittal plane. Thus, when the CRL of the fetus is to be measured and a currently obtained image is captured by photographing a front of the fetus, the user may move the image center point to a center of a mid-sagittal plane to obtain a medical image showing the mid-sagittal plane of the fetus.

The user input unit 220 according to an embodiment of the present invention may receive a value for setting the size of the object displayed on a second image when the object is normal.

According to an embodiment of the present invention, when the object is a fetus, the user input unit 220 may receive information about a GA of the fetus.

Also, when the object is a fetus, the user input unit 220 may receive, as a photographed item, at least one of an HC, a BPD, a cistern magna (CM), an FL, an anterior-posterior trunk diameter (APTD), a transverse trunk diameter (TTD), an AC, a CRL, a posterior horn of the lateral ventricle (Vp), and nuchal translucency (NT).

A scaling factor may be obtained by extracting statistic information corresponding to the object and an age from the memory 210, based on a user input.

The display unit 230 according to an embodiment of the present invention may display a second image including the object having the normalized size.

The display unit 230 according to an embodiment of the present invention may further display information corresponding to an object and indicating that the object is normal.

The display unit 230 according to an embodiment of the present invention may display a plurality of second images on one screen, the plurality of second images generated when the number of at least one of a photographed region and a photographed item of the object is at least two.

FIG. 3 shows images of a normalized object being displayed according to a method of processing a medical image, according to an embodiment of the present invention.

According to an embodiment of the present invention, an apparatus for processing a medical image may be an ultrasonic apparatus, an object may be a fetus, and a photographed item may be an FL.

According to an embodiment of the present invention, a user may input the "FL" as the photographed item. Also, the user may input a GA of the fetus, for example, 22 weeks, as additional information.

According to an embodiment of the present invention, the apparatus may store an average value of sizes of the object displayed on a first image correspondingly to an average value of actual object sizes, as statistic information about the object. For example, when an average value of FLs of a 22 week fetus is 4 cm and an initial scaling factor of a first image is 2, 8 cm that is an average value of FLs of the 22 week fetus displayed on the first image may be pre-stored in the ultrasonic apparatus, as statistic information.

A size of the object displayed on a second image when the object is normal may be pre-set or set via a user input. For example, an FL may be pre-set to be displayed in 16 cm on a second image when a fetus is normal.

According to an embodiment of the present invention, a scaling factor may be calculated according to Formula 1:

$$S \times \frac{N}{M} = 2 \times \frac{16}{8} = 4 \qquad \text{<Formula 1>}$$

The apparatus 100 may generate the second image for displaying the object after normalizing the size of the object by applying the scaling factor.

FIG. 3 (*a*) shows a second image obtained as the apparatus 100 photographs a fetus having a normal FL and applies a scaling factor calculated according to Formula 1 to the photographed fetus. In other words, a second image obtained by zooming a first image two times may be displayed as a scaling factor of 4 is applied. As a result, the FL of the fetus is about 16 cm.

FIG. 3 (*b*) shows a second image obtained as the apparatus 100 photographs a fetus having an FL that is shorter than a normal FL, and applies a scaling factor calculated according to Formula 1 to the photographed fetus. In other words, the fetus is displayed in the FL that is shorter than 16 cm, as the scaling factor of 4 is applied. A medical expert may look at the second image and intuitively determine an abnormality of the fetus.

FIG. 3 (*c*) shows a second image obtained as the apparatus 100 photographs a fetus having an FL that is longer than a normal FL, and applies a scaling factor calculated according to Formula 1 to the photographed fetus. In other words, the fetus is displayed in the FL that is longer than 16 cm, as the scaling factor of 4 is applied. A medical expert may look at the second image and intuitively determine an abnormality of the fetus.

According to another embodiment of the present invention, the apparatus 100 may store an average value of actual object sizes as statistic information about an object. For example, 4 cm that is an average value of FLs of a 22 week fetus may be pre-stored in the ultrasonic apparatus as statistic information. Also, an initial scaling factor of a first image may be stored as 2. In this case, an average value of sizes of the object displayed on the first image correspondingly to the average value of the actual object sizes may be calculated by multiplying the initial scaling factor of the first image by the average value of the actual object sizes.

A size of the object displayed on a second image when the object is normal may be pre-set or set via a user input. For example, when a fetus is normal, an FL may be pre-set to be displayed in 16 cm on a second image. A scaling factor may be calculated by dividing the size of the object displayed on the second image when the object is normal by the average value of the actual object sizes.

FIG. 4 shows images of a normalized object being displayed according to a method of processing a medical image, according to another embodiment of the present invention.

According to an embodiment of the present invention, the apparatus 100 may be an ultrasonic apparatus, an object may be a fetus, and a photographed item may be an FL. Statistic information may be determined based on a GA and the photographed item of the fetus.

The apparatus 100 according to an embodiment of the present invention may receive the photographed item and the GA of the fetus. For example, the apparatus 100 may receive "FL" as the photographed item.

According to an embodiment of the present invention, the apparatus 100 may store an average value of sizes of the object as statistic information about the object. For example, when an initial scaling factor of a first image is stored as 2 and an average value of FLs of a 24 week fetus is stored as 5 cm, an average value of FLs of the 24 week fetus displayed on the first image may be calculated to be 10 cm. Also, when an average value of FLs of a 28 week fetus is stored as 6 cm, an average value of FLs of the 28 week fetus displayed on the first image may be calculated to be 12 cm. Also, when an average value of FLs of a 33 week fetus is stored as 9 cm, an average value of FLs of the 33 week fetus displayed on the first image may be calculated to be 18 cm.

A size of the object displayed on the second image when the object is normal may be pre-set or set via a user input. For example, an FL of a normal fetus may be pre-set to be displayed on a second image, in 18 cm.

FIG. 4 (a) shows a second image obtained as the apparatus 100 photographs a 24 week fetus having a normal FL, and applies a scaling factor calculated according to Formula 1 to the photographed 24 week fetus.

According to an embodiment of the present invention, the scaling factor may be calculated according to Formula 1:

$$S \times \frac{N}{M} = 2 \times \frac{18}{10} = 3.6 \qquad \text{<Formula 1>}$$

The apparatus 100 may generate the second image to be displayed by normalizing the size of the object by applying the scaling factor. Accordingly, a normal FL of a fetus may be displayed on the second image in about 18 cm.

FIG. 4 (b) shows a second image obtained as the apparatus 100 photographs a 28 week fetus having a normal FL, and applies a scaling factor calculated according to Formula 1 to the photographed 28 week fetus.

According to an embodiment of the present invention, the scaling factor may be calculated according to Formula 1:

$$S \times \frac{N}{M} = 2 \times \frac{18}{12} = 3 \qquad \text{<Formula 1>}$$

The apparatus 100 may generate the second image to be displayed by normalizing the size of the object by applying the scaling factor. Accordingly, a normal FL of a fetus may be displayed on the second image in about 18 cm.

FIG. 4 (c) shows a second image obtained as the apparatus 100 photographs a 33 week fetus having a normal FL, and applies a scaling factor calculated according to Formula 1 to the photographed 33 week fetus.

According to an embodiment of the present invention, the scaling factor may be calculated according to Formula 1:

$$S \times \frac{N}{M} = 2 \times \frac{18}{18} = 2 \qquad \text{<Formula 1>}$$

The apparatus 100 may generate the second image to be displayed by normalizing the size of the object by applying the scaling factor. Accordingly, a normal FL of a fetus may be displayed on the second image in about 18 cm.

As a result, an FL of a normal fetus may be displayed in the same length, regardless of a GA.

Accordingly, a user may intuitively determine an abnormality of a fetus by looking at a second image displaying the fetus after normalizing a size of the fetus regardless of a GA.

Figure 5:
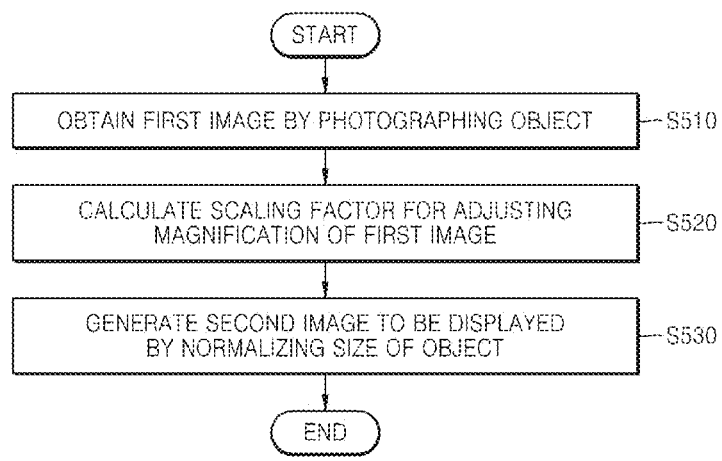
FIG. 5 is a flowchart of a method of processing a medical image, according to an embodiment of the present invention.

FIG. 5 is a flowchart of a method of processing a medical image, according to an embodiment of the present invention.

In operation S510, the apparatus 100 obtains a first image by photographing an object.

In operation S520, the apparatus 100 calculates a scaling factor for adjusting a magnification of the first image based on statistic information corresponding to the object.

The statistic information according to an embodiment of the present invention may be determined based on at least one of an age, a photographed region, and a photographed item of the object.

Also, the scaling factor may differ depending on at least one of a type, a photographing direction, and a photographing condition of an apparatus for photographing the object.

In operation S530, the apparatus 100 generates a second image to be displayed by normalizing a size of the object by applying the calculated scaling factor to the first image.

The apparatus 100 according to an embodiment of the present invention may display the second image including the object having the normalized size.

FIG. 6 is diagrams for describing displaying an object that is normalized by using different probes, according to an embodiment of the present invention.

In FIG. 6 (a), an image of an object 620 scanned by using an endocavitary probe 610 is displayed.

In FIG. 6 (b), an image of an object 650 scanned by using a convex probe 640 is displayed.

Images scanned by using different probes, i.e., the image of the object 620 scanned by using the endocavitary probe 610 and the image of the object 650 scanned by using the convex probe 640, may have different resolutions.

However, the apparatus 100 according to an embodiment of the present invention calculates a scaling factor for adjusting a magnification of an image based on statistic information corresponding to an object regardless of a type of a probe, and generates a second image by applying the calculated scaling factor to the image. Accordingly, even when objects 630 and 660 are photographed by using different types of probes, the objects 630 and 660 may be displayed on a second image, in the same size.

Figure 7:
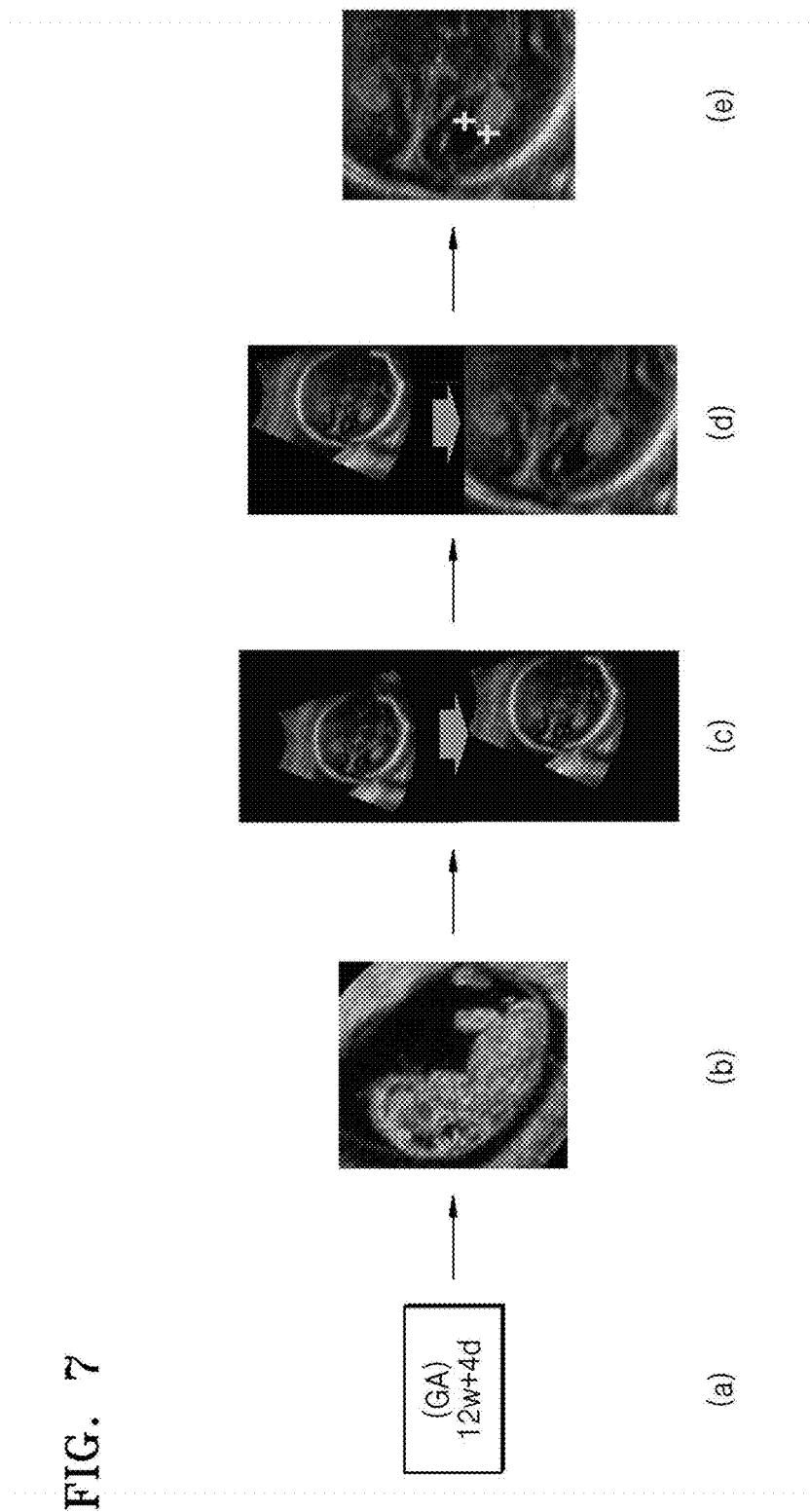
FIG. 7 is diagrams for describing generating an image by moving a center point, according to an embodiment of the present invention.

FIG. 7 is diagrams for describing generating an image by moving a center point, according to an embodiment of the present invention.

Referring to FIG. 7 (a), the apparatus 100 may receive a GA and a photographed item of a fetus based on a user input. For example, the apparatus 100 may receive information that a Vp of a 22 week fetus is to be captured based on a user input.

Referring to FIG. 7 (b), the apparatus 100 may obtain a first image by photographing an object. The first image may be an image to which an initial scaling factor of the apparatus 100 is applied.

The apparatus 100 according to an embodiment of the present invention may receive location information for moving an image center point based on a user input. For example, the apparatus 100 may set a new image center point based on a touch input on a touch screen.

The apparatus 100 according to another embodiment of the present invention may detect location information for moving an image center point based on a photographed region of the object. For example, the apparatus 100 may detect an image center point for locating a photographed item at a center of an image by using a detection algorithm, based on a user input on the photographed item.

Referring to FIG. 7 (c), the apparatus 100 may move the image center point and generate a modified first image having the moved image center point.

The apparatus 100 according to an embodiment of the present invention may move the image center point based on the received location information. The apparatus 100 may generate the modified first image having the moved image center point.

The apparatus 100 according to another embodiment of the present invention may move the image center point based on the detected location information. The apparatus 100 may generate the modified first image having the moved image center point.

Referring to FIG. 7 (*d*), the apparatus 100 may generate a second image by applying a scaling factor calculated based on statistic information about the object to the modified first image. The apparatus 100 may generate and display the second image in which the photographed item of the object is at a center and the object has the normalized size.

Referring to FIG. 7 (*e*), the apparatus 100 may display or measure the photographed item by using a caliper on the second image.

Figure 8:
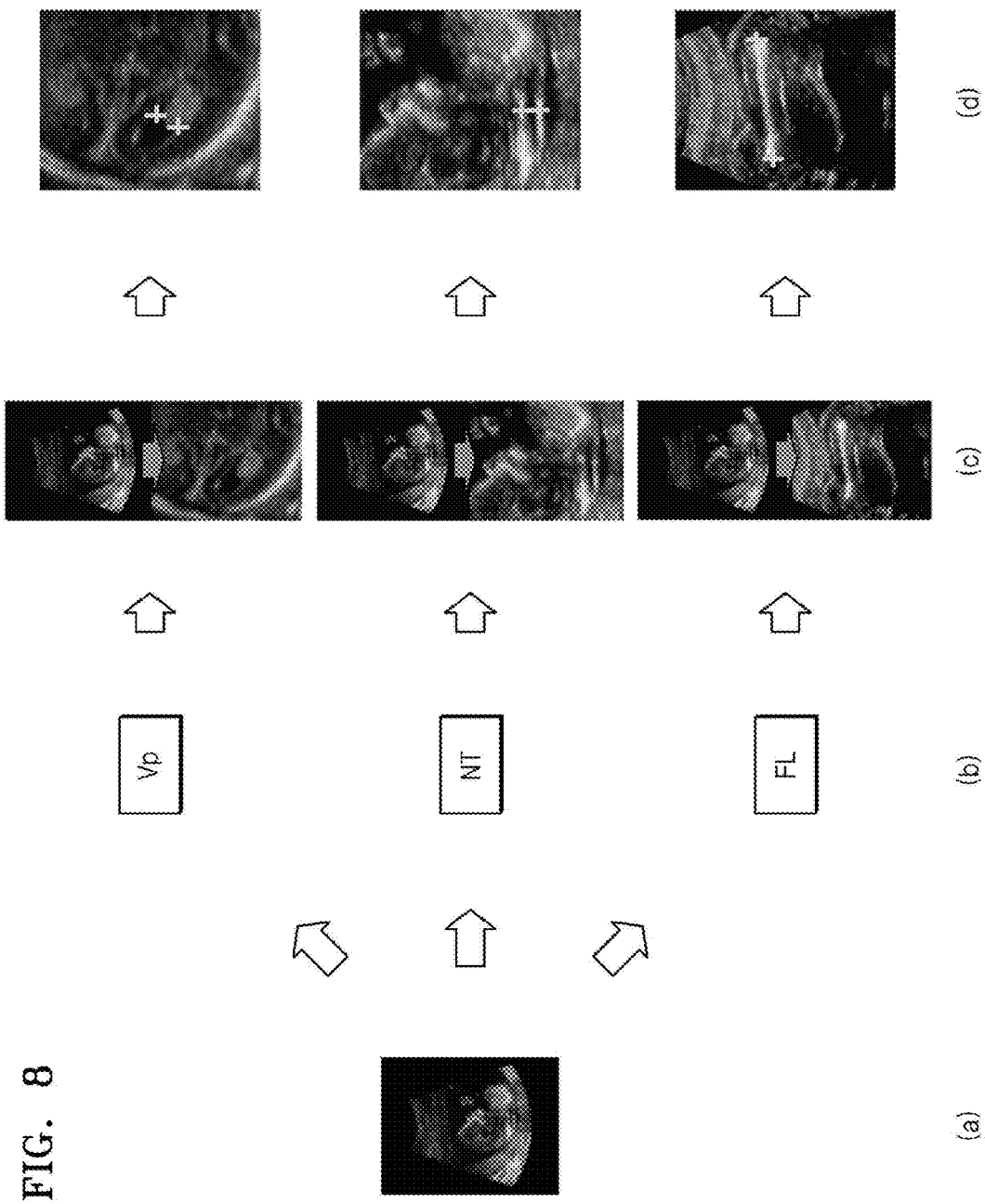
FIG. 8 is diagrams for describing a method of processing a medical image, when the number of at least one of a photographed region and a photographed item of an object is at least two, according to an embodiment of the present invention.

FIG. 8 is diagrams for describing a method of processing a medical image, when the number of at least one of a photographed region and a photographed item of an object is at least two, according to an embodiment of the present invention.

Referring to FIGS. 8 (*a*) and (*b*), the apparatus 100 may be an ultrasonic apparatus, an object may be a fetus, and photographed items may be Vp, Nt, and FL.

Referring to FIG. 8 (*c*), the apparatus 100 according to an embodiment of the present invention may calculate a plurality of scaling factors for each of a plurality of photographed regions or photographed items. For example, the apparatus 100 may calculate a scaling factor for each Vp, for each Nt, and for each FL according to a first image obtained by photographing the fetus.

The apparatus 100 may generate a plurality of second images by applying the calculated plurality of scaling factors to the first image. For example, the apparatus 100 may sequentially display the plurality of second images. In another example, the apparatus 100 may display one of the plurality of second images based on a user's selection. In another example, the apparatus 100 may display the plurality of second images on one screen.

Referring to FIG. 8 (*d*), the apparatus 100 according to an embodiment of the present invention may display or measure a photographed item by using a caliper on the second image.

Figure 9A:
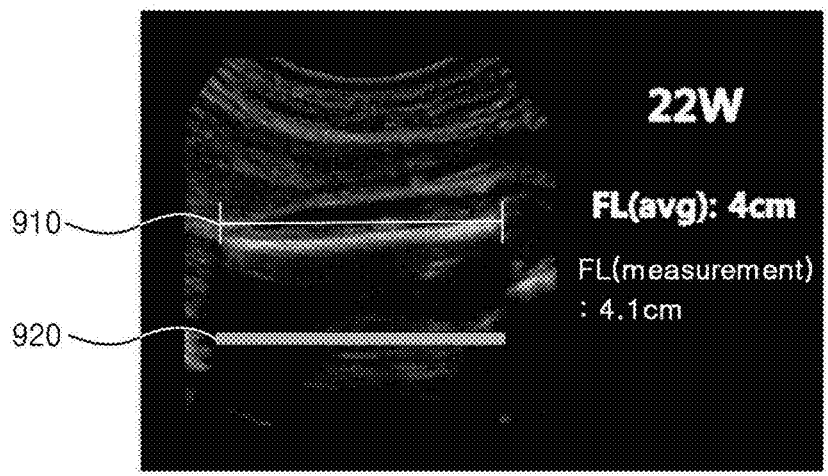
FIGS. 9A and 9B are images of display screens, according to embodiments of the present invention.
Figure 9B:
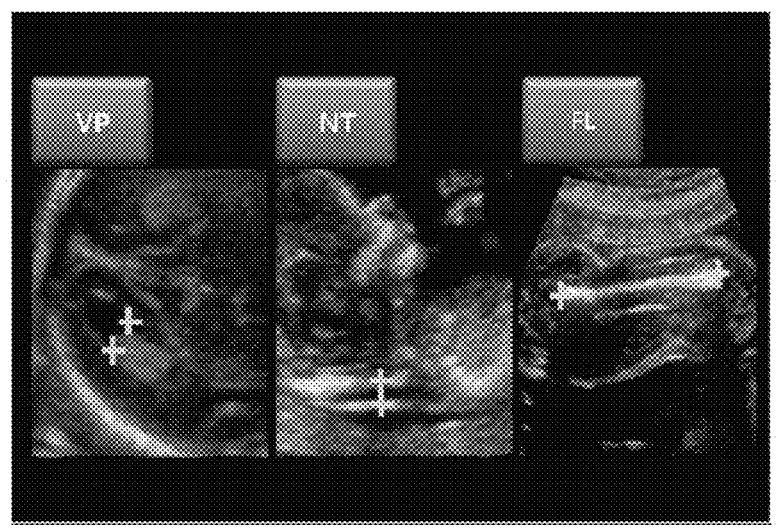

FIGS. 9A and 9B are images of display screens, according to embodiments of the present invention.

The apparatus 100 according to an embodiment of the present invention may display a second image by including at least one of information indicating a normal object and corresponding to previous photographing information of an object, a scaling factor, an actual length, and an object.

Referring to FIG. 9A, the apparatus 100 may display, on a second image, an object 910 and a size 920 of an object displayed on the second image when the object is normal. A user may compare the object 910 that is actually photographed, and the size 920 of the object displayed on the second image when the object is normal so as to further easily and intuitively determine an abnormality of the object 910.

Alternatively, the apparatus 100 may display the second image after including an average value of actual object sizes and a measured value of the object 910 that is actually photographed to the second image.

Referring to FIG. 9B, the apparatus 100 according to an embodiment of the present invention may display a plurality of second images on one screen.

As described above with reference to FIG. 8, the apparatus 100 according to an embodiment of the present invention may calculate a plurality of scaling factors for each of a plurality of photographed regions or photographed items. The apparatus 100 may generate the plurality of second images by applying the calculated plurality of scaling factors to a first image.

Referring back to FIG. 9B, the apparatus 100 according to an embodiment of the present invention may generate a plurality of second images for Vp, NT, and FL, i.e., photographed items, of a first image obtained by photographing a fetus, and display the plurality of second images on one screen.

Figure 10:
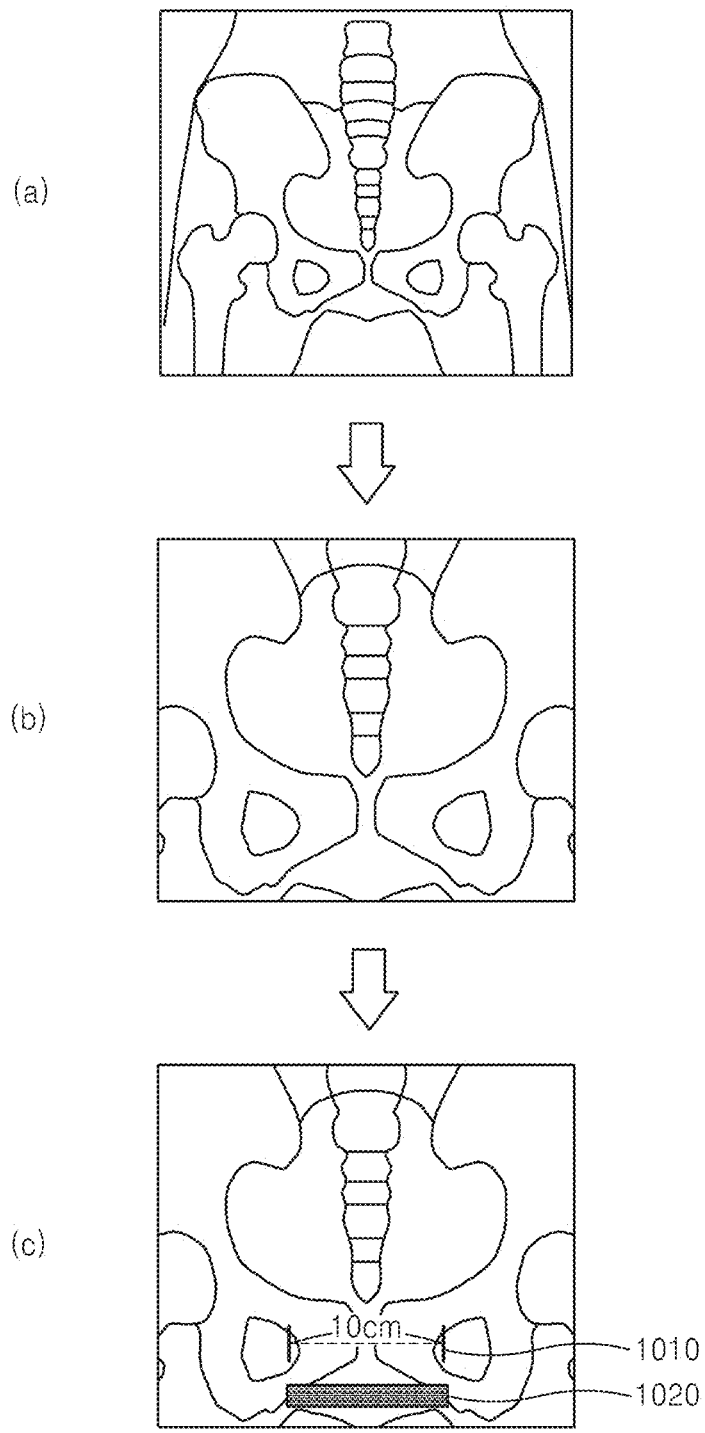
FIG. 10 is diagrams for describing a method of processing a medical image applied to an X-ray apparatus, according to an embodiment of the present invention.

FIG. 10 is diagrams for describing a method of processing a medical image applied to an X-ray apparatus, according to an embodiment of the present invention.

For example, the apparatus 100 according to an embodiment of the present invention may be the X-ray apparatus, an object may be a person, and a photographed region may be a pelvis. Also, the apparatus 100 may receive an age, a gender, and the photographed region of the object based on a user input.

Referring to FIG. 10 (*a*), the X-ray apparatus may obtain a first image by photographing the pelvis that is the photographed region of the object.

Referring to FIG. 10 (*b*), the X-ray apparatus may calculate a scaling factor based on statistic information corresponding to the object. The statistic information may include an average of actual pelvis sizes of people of the same age and same gender as the object.

For example, the average value of the actual pelvis sizes of people of the same age and same gender as the object may be 10 cm, and when an initial scaling factor of a first image is 1, an average value of pelvis sizes of the object displayed on the first image correspondingly to the average value of the actual pelvis sizes may be 10 cm. When a pelvis size of the object displayed on a second image is set to be 20 cm when the object is normal, a scaling factor may be calculated to be 2.

The X-ray apparatus may generate the second image by applying the calculated scaling factor to the first image. In other words, the X-ray apparatus may generate a second image by expanding the first image twice and normalizing the size of the object.

Referring to FIG. 10 (*c*), the X-ray apparatus may display a second image by including an actual measurement value 1010 and a size 1020 of an object displayed on the second image when the object is normal to the second image.

Figure 11:
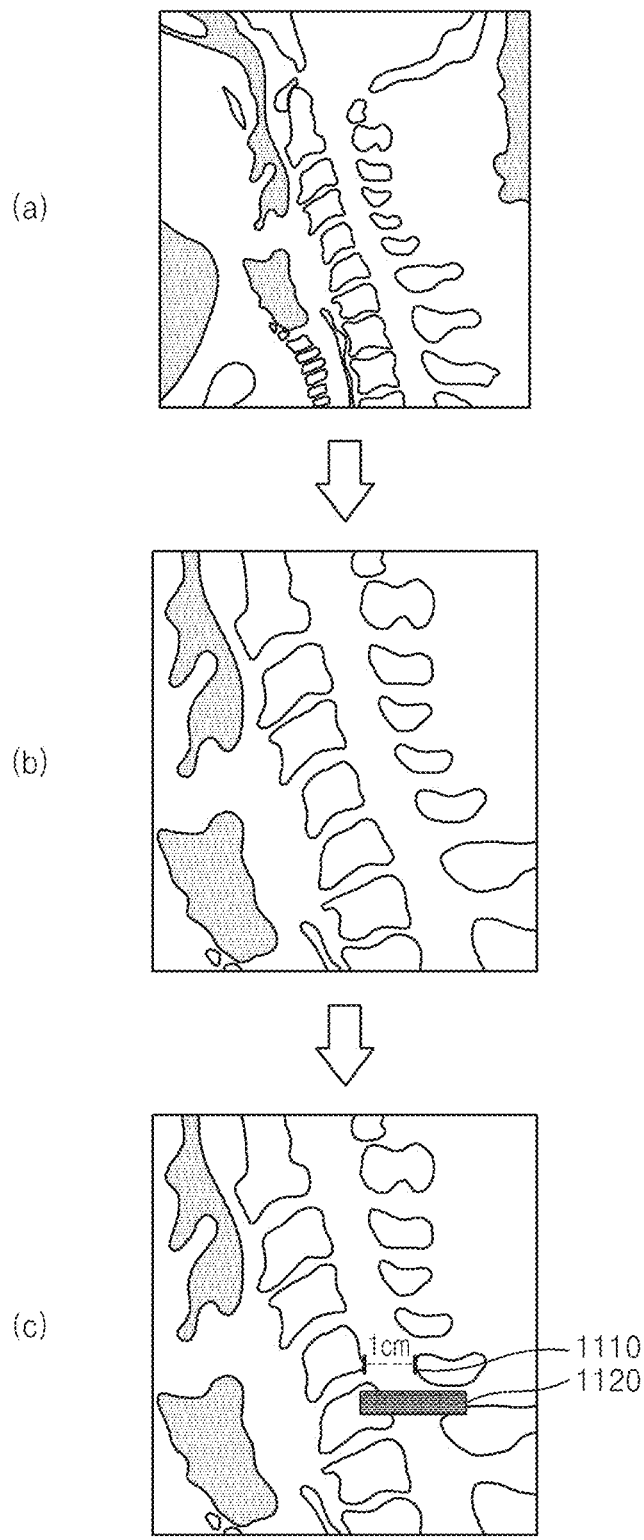
FIG. 11 is diagrams for describing a method of processing a medical image applied to a computed tomography (CT) apparatus, according to an embodiment of the present invention.

FIG. 11 is diagrams for describing a method of processing a medical image applied to a CT apparatus, according to an embodiment of the present invention.

For example, the apparatus 100 according to an embodiment of the present invention may be the CT apparatus, an object may be a person, and a photographing region may be a spine. Also, the apparatus 100 may receive an age, a gender, and the photographed region of the object based on a user input.

The CT apparatus according to an embodiment of the present invention may diagnose cervical spinal canal stenosis by photographing a spine canal of a cervical vertebral portion. The cervical spinal canal stenosis is a phenomenon in which various symptoms are generated in a region of nerves that are stimulated as a spine canal around the neck narrows.

Referring to FIG. 11 (*a*), the CT apparatus may obtain a first image by photographing a spine canal in a cervical vertebral portion that is a photographed region of the object.

Referring to FIG. 11 (*b*), the CT apparatus may calculate a scaling factor based on statistic information corresponding to the object. The statistic information may include an average value of cervical spinal canal thicknesses of people of the same age and same gender as the object.

For example, an average value of cross-sectional thicknesses of cervical spinal canals of people of the same age and same gender as the object may be 2 cm, and when an initial scaling factor of a first image is 2, an average value of sizes of the object displayed on the first image correspondingly to the average value of the cross-sectional thicknesses may be 4 cm. When a cross-sectional thickness of a cervical spinal canal of the object displayed on a second image when the object is normal is set to be 10 cm, a scaling factor may be calculated to be 5.

The CT apparatus may generate the second image by applying the calculated scaling factor to the first image. In other words, the CT apparatus may generate the second image by expanding the first image 2.5 times and normalizing the size of the object.

Referring to FIG. 11 (c), the CT apparatus may display the second image by including an actual measurement value 1110 and a size 1120 of the object displayed on the second image when the object is normal, to the second image.

Figure 12:
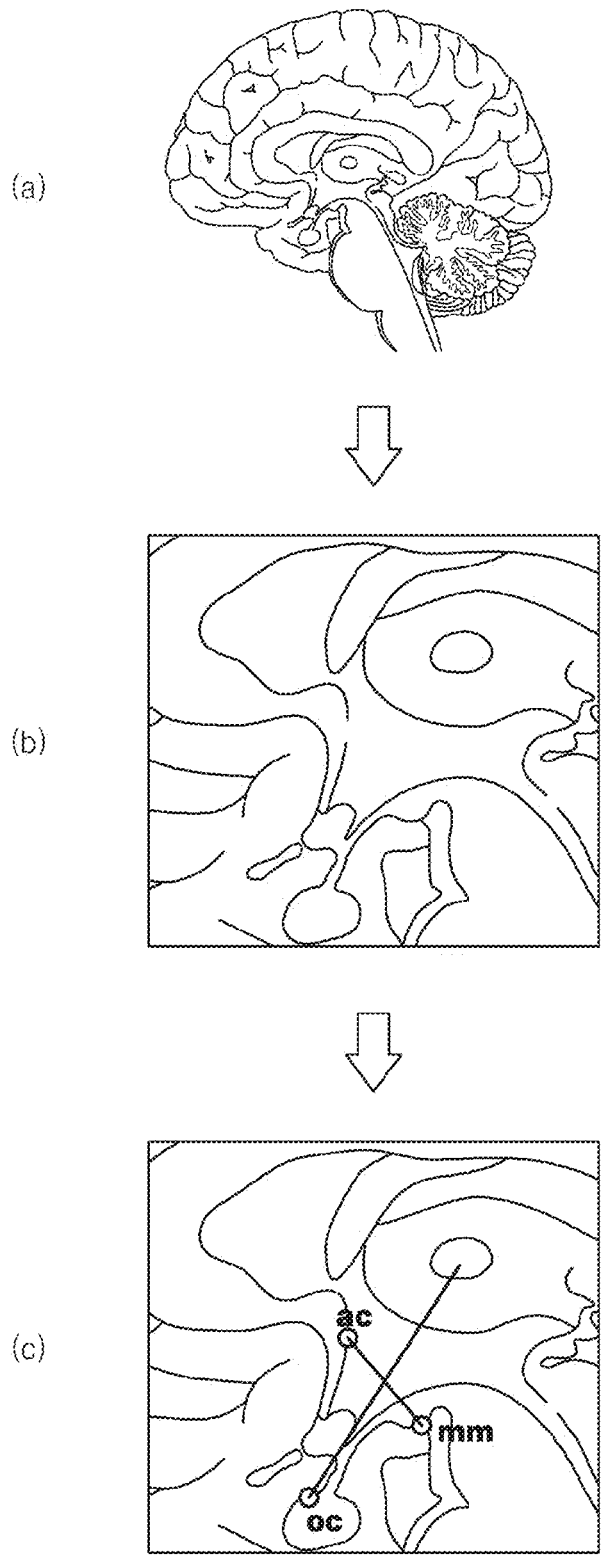
FIG. 12 is diagrams for describing a method of processing a medical image applied to a magnetic resonance imaging (MRI) apparatus, according to an embodiment of the present invention.

FIG. 12 is diagrams for describing a method of processing a medical image applied to an MRI apparatus, according to an embodiment of the present invention.

For example, the apparatus 100 according to an embodiment of the present invention may be the MRI apparatus, an object may be a person, and a photographed region may be a lateral brain. Also, the apparatus 100 may receive an age, a gender, and a photographed region of the object based on a user input. The MRI apparatus according to an embodiment of the present invention may diagnose an abnormality of a hypothalamus function by photographing the lateral brain.

Referring to FIG. 12 (a), the MRI apparatus may obtain a first image by photographing the lateral brain that is the photographed region of the object.

Referring to FIG. 12 (b), the MRI apparatus may calculate a scaling factor based on statistic information corresponding to the object.

Referring to FIG. 12 (c), the MRI apparatus may display a second image together with a caliper.

As described above, according to the one or more of the above embodiments of the present invention, an object may be displayed after normalizing a size of the object.

By using a medical image in which the size of the object is normalized, a user may intuitively determine an abnormality of the object.

An embodiment of the present invention may also be realized in a form of a computer-readable recording medium, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

While the present invention has been particularly shown and described with reference to exemplary embodiments thereof, it will be understood by those of ordinary skill in the art that various changes in form and details may be made therein without departing from the spirit and scope of the present invention as defined by the following claims. Hence, it will be understood that the embodiments described above are not limiting the scope of the invention. For example, each component described in a single type may be executed in a distributed manner, and components described distributed may also be executed in an integrated form.

The scope of the present invention is indicated by the claims which will be described in the following rather than the detailed description of the invention, and it should be understood that the claims and all modifications or modified forms drawn from the concept of the claims are included in the scope of the present invention.

What is claimed is:

1. An apparatus for processing a medical image, the apparatus comprising:
    an image obtainer that receives a first image including an object;
    a memory that stores a representative value of object size, the representative value being determined based on at least one of an age including gestational age, a photographed region, and an item of the object;
    an image processor that calculates a scaling factor based on the representative value and a size of the object to be displayed when the size of the object is the representative value, and generates a second image having the calculated scaling factor by adjusting a magnification of the first image; and
    a display that displays the second image.

2. The apparatus of claim 1, wherein the scaling factor differs depending on at least one of a type, a photographing direction, and a photographing condition of an apparatus for photographing the object.

3. The apparatus of claim 1, wherein the representative value comprises an average value of sizes of the object being displayed on the first image correspondingly to an average value of actual object sizes.

4. The apparatus of claim 1, wherein the scaling factor is calculated according to Formula 1:

$$S \times \frac{N}{M} \qquad \text{<Formula 1>}$$

wherein in Formula 1, S denotes an initial scaling factor of the first image, M denotes an average value of sizes of the object being displayed on the first image correspondingly to an average value of actual object sizes, and N denotes a size of the object being displayed on the second image when the object is normal.

5. The apparatus of claim 1, wherein the medical image is at least one of a computed tomography (CT) image, a magnetic resonance (MR) image, an X-ray image, and an ultrasonic image.

6. The apparatus of claim 1, wherein the medical image is an ultrasonic image, the object is fetus, and the representative value is determined based on a gestational age of the fetus.

7. The apparatus of claim 1, further comprising a user input unit that receives location information for moving an image center point, wherein the image processor moves the image center point based on the input location information and generates the second image having the calculated scaling factor by adjusting a magnification of a modified first image having the moved image center point.

8. The apparatus of claim 1, wherein the image processor detects location information for moving an image center point based on a photographed region of the object, moves the image center point based on the detected location information, and generates the second image having the calculated scaling factor by adjusting a magnification of a modified first image having the moved image center point.

9. The apparatus of claim 1, wherein the second image corresponds to the object and comprises information indicating a normal object.

10. The apparatus of claim 1, wherein the number of at least one of the photographed region and the item of the object is at least two, and
the image processor calculates a plurality of scaling factors for each of the at least two photographed regions or the at least two items and generates a plurality of second images having the calculated plurality of scaling factors by adjusting a magnification of the first image.

11. The apparatus of claim 10, wherein the display unit displays the plurality of second images on one screen.

12. A method of processing a medical image, the method comprising:
storing a representative value of object size, the representative value being determined based on at least one of an age including gestational age, a photographed region, and an item of an object;
obtaining a first image including the object;
calculating a scaling factor based on the representative value and a size of the object to be displayed when the size of the object is the representative value;
generating a second image having the calculated scaling factor by adjusting a magnification of the first image; and
displaying the second image.

13. The method of claim 12, wherein the scaling factor differs depending on at least one of a type, a photographing direction, and a photographing condition of an apparatus for photographing the object.

14. The method of claim 12, wherein the scaling factor is calculated according to Formula 1:

$$S \times \frac{N}{M} \qquad \text{<Formula 1>}$$

wherein in Formula 1, S denotes an initial scaling factor of the first image, M denotes an average value of sizes of the object being displayed on the first image correspondingly to an average value of actual object sizes, and N denotes a size of the object being displayed on the second image when the object is normal.

15. The method of claim 12, wherein the medical image is at least one of a computed tomography (CT) image, a magnetic resonance (MR) image, an X-ray image, and an ultrasonic image.

16. The method of claim 12, wherein the medical image is an ultrasonic image, the object is a fetus, and the representative value is determined based on a gestational age of the fetus.

17. The method of claim 16, wherein the item of the object comprises at least one of a head circumference (HC), a biparietal diameter (BPD), a cistern magna (CM), a femur length (FL), an anterior-posterior trunk diameter (APTD), a transverse trunk diameter (TTD), an abdominal circumference (AC), a crown rump length (CRL), a posterior horn of the lateral ventricle (Vp), and nuchal translucency (NT).

18. The method of claim 12, wherein the generating of the second image comprises:
receiving location information for moving an image center point based on a user input;
moving the image center point based on the received location information and generating a modified first image having the moved image center point; and
generating the second image having the calculated scaling factor by adjusting a magnification of the modified first image.

19. The method of claim 12, wherein the generating of the second image comprises:
detecting location information for moving an image center point based on a photographed region of the object;
moving the image center point based on the detected location information and generating a modified first image having the moved image center point; and
generating the second image having the calculated scaling factor by adjusting a magnification of the modified first image.

20. The method of claim 12, wherein the second image corresponds to the object and comprises information indicating a normal object.

\* \* \* \* \*